US009881221B2

(12) United States Patent
Bala et al.

(10) Patent No.: US 9,881,221 B2
(45) Date of Patent: Jan. 30, 2018

(54) METHOD AND SYSTEM FOR ESTIMATING GAZE DIRECTION OF VEHICLE DRIVERS

(71) Applicant: Xerox Corporation, Norwalk, CT (US)

(72) Inventors: Raja Bala, Pittsford, NY (US); Edgar Bernal, Webster, NY (US); Aaron Burry, Ontario, NY (US); Peter Paul, Penfield, NY (US); David Chuang, Seattle, WA (US)

(73) Assignee: Conduent Business Services, LLC, Dallas, TX (US)

( * ) Notice: Subject to any disclaimer, the term of this patent is extended or adjusted under 35 U.S.C. 154(b) by 494 days.

(21) Appl. No.: 14/274,315

(22) Filed: May 9, 2014

(65) Prior Publication Data

US 2015/0116493 A1 Apr. 30, 2015

Related U.S. Application Data

(60) Provisional application No. 61/894,944, filed on Oct. 24, 2013.

(51) Int. Cl.
*H04N 7/18* (2006.01)
*G06K 9/00* (2006.01)
*G06K 9/62* (2006.01)

(52) U.S. Cl.
CPC ..... *G06K 9/00845* (2013.01); *G06K 9/00281* (2013.01); *G06K 9/6277* (2013.01)

(58) Field of Classification Search
CPC ........... G06K 9/00281; G06K 9/00845; G06K 9/6277
USPC ........................................................ 348/148
See application file for complete search history.

(56) References Cited

U.S. PATENT DOCUMENTS

| 5,532,784 A | 7/1996 | Nishimura et al. |
| 6,154,559 A * | 11/2000 | Beardsley ............. A61B 3/113 340/576 |
| 6,859,144 B2 | 2/2005 | Newman et al. |
| 6,974,414 B2 | 12/2005 | Victor |

(Continued)

OTHER PUBLICATIONS

Murphy-Chutorian, E. et al., "Head Pose Estimation for Driver Assistance Systems: A Robust Algorithm and Experimental Evaluation" Proc. IEEE Intelligent Transportation System Conferences Sep. 30-Oct. 3, 2007, Seattle, WA p. 709-714.*

(Continued)

*Primary Examiner* — Jessica M Prince
(74) *Attorney, Agent, or Firm* — Kermit D. Lopez; Luis M. Ortiz; Ortiz & Lopez, PLLC

(57) ABSTRACT

Methods and systems for continuously monitoring the gaze direction of a driver of a vehicle over time. Video is received, which is captured by a camera associated with, for example, a mobile device within a vehicle, the camera and/or mobile device mounted facing the driver of the vehicle. Frames can then be extracted from the video. A facial region can then be detected, which corresponds to the face of the driver within the extracted frames. Features descriptors can then be computed from the facial region. A gaze classifier derived from the vehicle, the driver, and the camera can then be applied, wherein the gaze classifier receives the feature descriptors as inputs and outputs at least one label corresponding to one or more predefined finite number of gaze classes to identify the gaze direction of the driver of the vehicle.

20 Claims, 10 Drawing Sheets

(56) References Cited

U.S. PATENT DOCUMENTS

| | | | |
|---|---|---|---|
| 8,144,002 B2 | 3/2012 | Kiuchi | |
| 8,218,832 B2 | 7/2012 | Inada | |
| 8,384,534 B2 | 2/2013 | James et al. | |
| 8,406,457 B2 | 3/2013 | Matsuoka et al. | |
| 2010/0007479 A1 | 1/2010 | Smith | |
| 2011/0310006 A1 | 12/2011 | Edwards et al. | |
| 2012/0071891 A1* | 3/2012 | Itkowitz | A61B 19/2203 606/130 |
| 2012/0280897 A1* | 11/2012 | Balan | G06F 3/017 345/156 |
| 2013/0189649 A1 | 7/2013 | Mannino | |
| 2014/0139655 A1* | 5/2014 | Mimar | G08B 21/0476 348/77 |
| 2014/0204193 A1* | 7/2014 | Zhang | G06K 9/00597 348/78 |
| 2014/0254936 A1* | 9/2014 | Sun | G06K 9/48 382/195 |

OTHER PUBLICATIONS

You, C. -W et al., "CarSafe App:Alerting Drowsy and Distracted Drivers using Dual Cameras on Smartphones," Proc. 11th Annual International Conf. on Mobile Systems, Applicants, and Services Jun. 23-28, 2013 Taipei, Taiwan, 14 pages.*

Parimita Saikia, "Head Gesture Recognition Using Optical Flow Based Classification with Reinforcement of GMM Based Background Subtraction" International Journal of Computer Applications (0975-8887) vol. 65 No. 25, Mar. 2013.*

Murphy-Chutorian, E et al., Head Pose Estimation for Driver Assistance System : A Robust Algorithm and Experimental Evaluation, Proc. IEEE Intelligent Transportation System Conferences Sep. 30-Oct. 3, 2007 Seattle WA p. 709-714.*

You, C. W et al., CarSafe App: Alerting Drowsey and Distracted Drivers using Dual Cameras on Smartphones, Proc. 11th Annual International Conf. on Mobile Systems, Applicants and Services Jun. 23-28, 2013 Taipei, Taiwan, 14 pages.*

Bertozzi, M. et al., "Vision-based intelligent vehicles: State of the art and perspectives," Robotics and Autonomous Systems (2000) 32:1-16.

Bertozzi, M. et al., "Artificial Vision in Road Vehicles," Proceedings of the IEEE (2002) 90(7):1258-1271.

"Blueprint for Ending Distracted Driving," NHTSA Report (2012), www.distraction.gov, 20 pages.

Eren, H. et al., "Estimating Driving Behavior by a Smartphone," 2012 Intelligent Vehicles Symposium, Jun. 3-7, Alcala de Henares. Spain, pp. 234-239.

Hansen, D. W. et al., "In the Eye of the Beholder: A Survey of Models for Eyes and Gaze," IEEE Transactions on Pattern Analysis and Machine Intelligence (2010) 32(3):478-500.

Ji, Q. et al., "Real-Time Eye, Gaze, and Face Pose Tracking for Monitoring Driver Vigilance," Real-Time Imaging (2002) 8:357-377.

Murphy-Chutorian, E. et al., "Head Pose Estimation for Driver Assistance Systems: A Robust Algorithm and Experimental Evaluation," Proc. IEEE Intelligent Transportation Systems Conference Sep. 30-Oct. 3, 2007, Seattle, WA, pp. 709-714.

Murphy-Chutorian, E. et al., "Head Pose Estimation in Computer Vision: A Survey," IEEE Transactions on Pattern Analysis and Machine Intelligence (2009) 31(4):607-626.

Reale, M. et al., "Pointing with the Eyes: Gaze Estimation Using a Static/Active Camera System and 3D Iris Disk Model," 2010 IEEE International Conference on Multimedia and Expo (ICME) Jul. 19-23, Suntec City, pp. 280-285.

Viola, P. et al., "Rapid Object Detection using a Boosted Cascade of Simple Features," Proceedings of the 2001 IEEE Computer Society Conference on Computer Vision and Pattern Recognition (2001) vol. 1, pp. I-511-I-518.

You, C.-W. et al., "CarSafe App: Alerting Drowsy and Distracted Drivers using Dual Cameras on Smartphones," Proc. 11$^{th}$ Annual International Conf. on Mobile Systems, Applications, and Services Jun. 25-28, 2013, Taipei, Taiwan, 14 pages.

iOnRoad mobile app: http://ww.ionroad.com.

* cited by examiner

|  | LEFT MIRROR | ROAD | DASH BOARD | SIGN | TOP MIRROR | PHONE/ TEXT | MUSIC CONSOLE | RIGHT MIRROR |
|---|---|---|---|---|---|---|---|---|
| LEFT MIRROR | 4 | 5 | 11 | 15 | 0 | 1 | 0 | 5 |
| ROAD | 0 | 1300 | 0 | 0 | 0 | 0 | 0 | 0 |
| DASH BOARD | 0 | 22 | 28 | 0 | 0 | 0 | 0 | 0 |
| SIGN | 0 | 17 | 0 | 10 | 0 | 0 | 0 | 0 |
| TOP MIRROR | 0 | 4 | 1 | 0 | 52 | 0 | 0 | 0 |
| PHONE/ TEXT | 0 | 0 | 0 | 0 | 6 | 23 | 0 | 0 |
| MUSIC CONSOLE | 0 | 0 | 0 | 3 | 2 | 3 | 80 | 0 |
| RIGHT MIRROR | 0 | 0 | 0 | 0 | 0 | 0 | 4 | 52 |

FIG. 10

METHOD AND SYSTEM FOR ESTIMATING GAZE DIRECTION OF VEHICLE DRIVERS

CROSS-REFERENCE TO PROVISIONAL APPLICATION

This application claims priority under 35 U.S.C. 119(e) to U.S. Provisional Patent Application Ser. No. 61/894,944, entitled "Method and System for Estimating Gaze Direction of Vehicle Drivers," which was filed on Oct. 24, 2013, the disclosure of which is incorporated herein by reference in its entirety.

FIELD OF THE INVENTION

Embodiments are generally related to the field of driver monitoring. Embodiments are also related to image-capturing units and mobile communications devices, such as, for example, Smartphones and tablet computing devices. Embodiments are additionally related to techniques for estimating and monitoring the gaze direction of a vehicle driver.

BACKGROUND

Vehicle accidents are often caused by driver drowsiness and inattention. In-vehicle cameras and sensors coupled with computer vision techniques can be employed to automatically monitor driver behavior and enhance safety and reduce accidents. In-vehicle video analytics can also be employed in the context of evidentiary support, for example, when adjudicating traffic violations or accidents. Such monitoring devices are typically found only in high-end vehicles and rely upon sophisticated image-capturing and processing afforded by specialized hardware that interacts with built-in vehicle telematics. Such systems, however, are expensive to implement and not currently very reliable.

Several approaches have been suggested for monitoring driver behavior. One technique involves, for example, the use of a mobile device such as a smartphone or portable camera that can be temporarily mounted within the vehicle for the purpose of driver monitoring. Such mobile monitoring devices can potentially offer a cost-effective service for users who do not rely upon dedicated built-in systems (e.g., systems implemented by automobile manufacturers). An inertial sensor and components such as an accelerometer, a gyroscope, and/or a magnetometer associated with the mobile device can be utilized to obtain data such as the position, speed, acceleration, deflection angle, etc., of the device and relate this information to driver behavior. Such an approach can monitor some aspects of driving behavior; however, it cannot predict significant events such as driver drowsiness, inattention, or other distractions that may lead to unsafe driving conditions.

Another approach involves the use of a mobile monitoring device placed on a windshield with a rear camera facing the road. This application can monitor the distance to nearby vehicles along with lane departure data and the vehicle speed via Global Positioning System (GPS). Such an approach however, does not capture any data about the state of the driver and thus cannot accurately monitor driver attention or fatigue. Another approach employs dual video captured from a driver-facing (or front) and road-facing (or rear) camera that automatically switches between front and rear cameras based on detection of various events. Such an approach provides only a coarse estimate of gaze and is not accurate.

Based on the foregoing, it is believed that a need exists for an improved method and system for estimating and monitoring the gaze direction of a driver in a vehicle for real time execution via a portable mobile device, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved driver monitoring methods and systems.

It is another aspect of the disclosed embodiments to provide for an improved method and system for estimating and monitoring the gaze direction of a driver in a vehicle.

It is yet another aspect of the disclosed embodiments to provide for an improved technique for training a gaze classifier.

The aforementioned aspects and other objectives and advantages can now be achieved as described herein. Methods and systems for identifying the gaze direction of a driver of a vehicle are disclosed herein. In general, video captured by a camera associated with a mobile device mounted facing the driver of the vehicle can be captured via the camera (e.g., video camera). A facial region can be detected corresponding to the face of the driver within the video received and captured by the camera. Feature descriptors can be computed from the facial region. A gaze classifier can be applied, which is derived for the vehicle, the driver, and the camera, wherein the gaze classifier receives the feature descriptors as inputs and outputs a label corresponding to at least one of a predefined finite number of gaze classes to identify a gaze direction of the driver of the vehicle.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

FIG. 10 illustrates a table depicting confusion matrix, in accordance with the disclosed embodiments;

DETAILED DESCRIPTION

Figure 1:
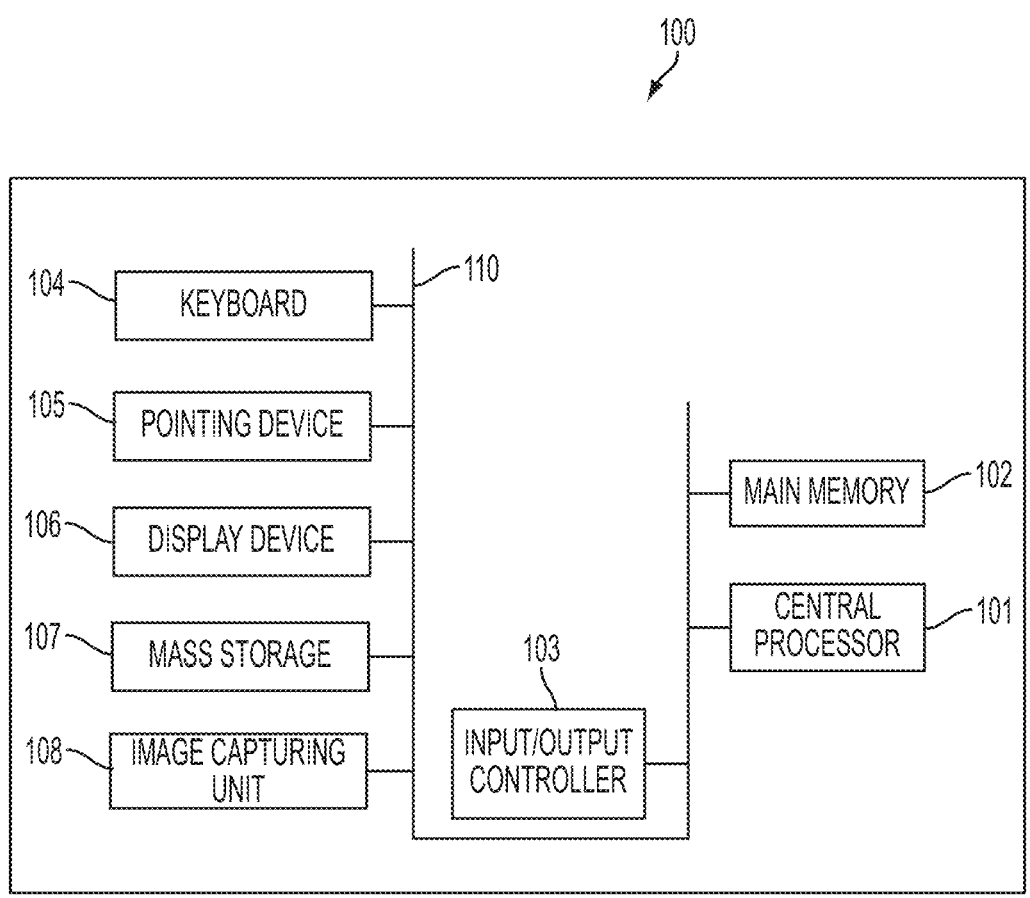
FIG. 1 illustrates a schematic view of a computer system, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the one or more of the disclosed embodiments can be implemented as a method, data processing system, or computer program product. Accordingly, embodiments may take the form of an entire hardware embodiment, an entire software embodiment or an embodiment combining software and hardware aspects all generally referred to herein as a "circuit" or "module." Furthermore, embodiments may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
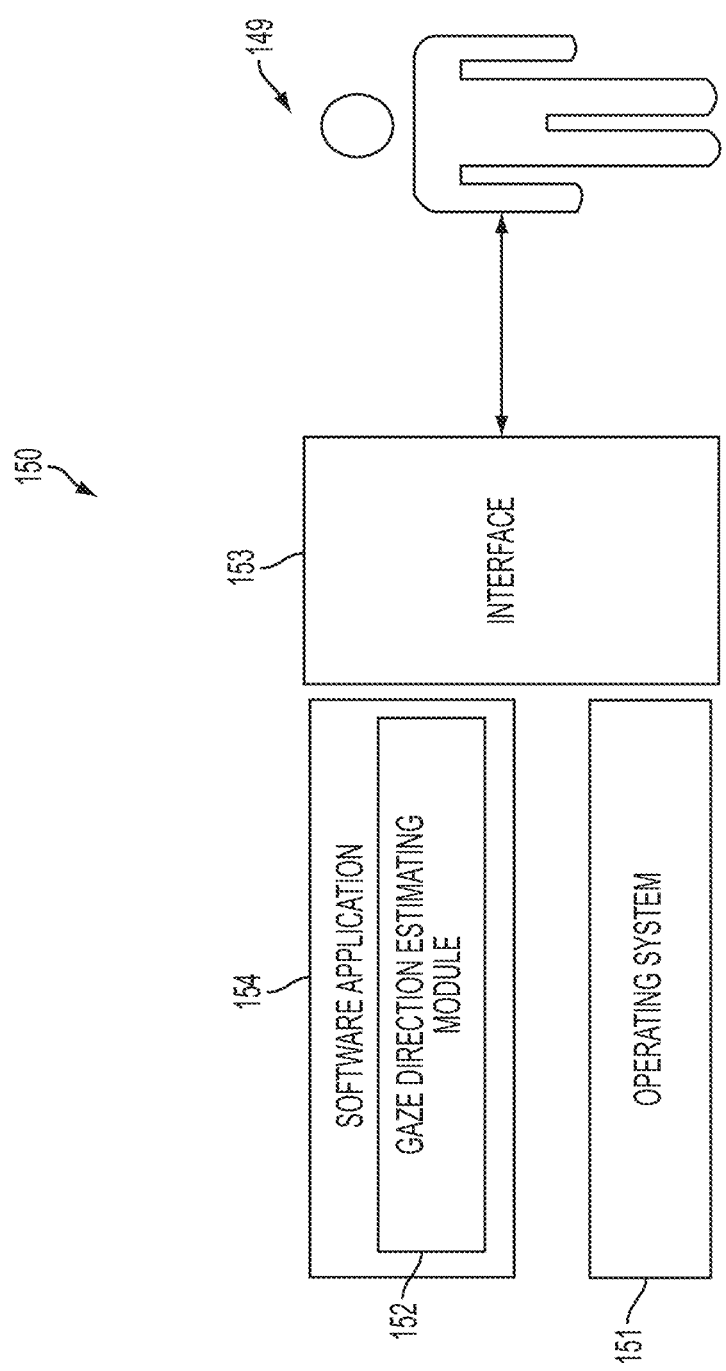
FIG. 2 illustrates a schematic view of a software system including a gaze direction estimating module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device, such as a mouse, track ball, pen device, etc.), a display device 106, a mass storage 107 (e.g., a hard disk), and an image capturing unit 108. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 2. Software application 154, stored in main memory 102 and on mass storage 107, generally includes a gaze directing module 152. The software system 150 includes the software application 154 and a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked personal computers, minicomputers, mainframe computers, servers, and the like.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task.

The interface 153, which is preferably a graphical user interface (GUI), can serve to display results, whereupon a user may supply additional inputs or terminate a particular session. In some embodiments, operating system 151 and interface 153 can be implemented in the context of a "windows" system. It can be appreciated, of course, that other types of systems are possible. For example, rather than a traditional "windows" system, other operation systems such as, for example, a real time operating system (RTAS) more commonly employed in wireless systems may also be employed with respect to operating system 151 and interface 153. The software application 154 can include, for example, a gaze direction estimating module 152 for estimating and monitoring a gaze direction of a driver 250 in a vehicle 202 that is amenable for real time execution on a portable mobile communications device. The gaze direction estimating module 152 can include instructions, such as those of method 300 discussed herein with respect to FIG. 3 and/or method 302 discussed herein with respect to FIG. 4.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, Unix, Linux, and the like. The system 150 can be implemented, for example, in the context of a mobile device such as the mobile device 206 which is shown, for example, in FIGS. 6-7 and 9 herein.

Figure 3:
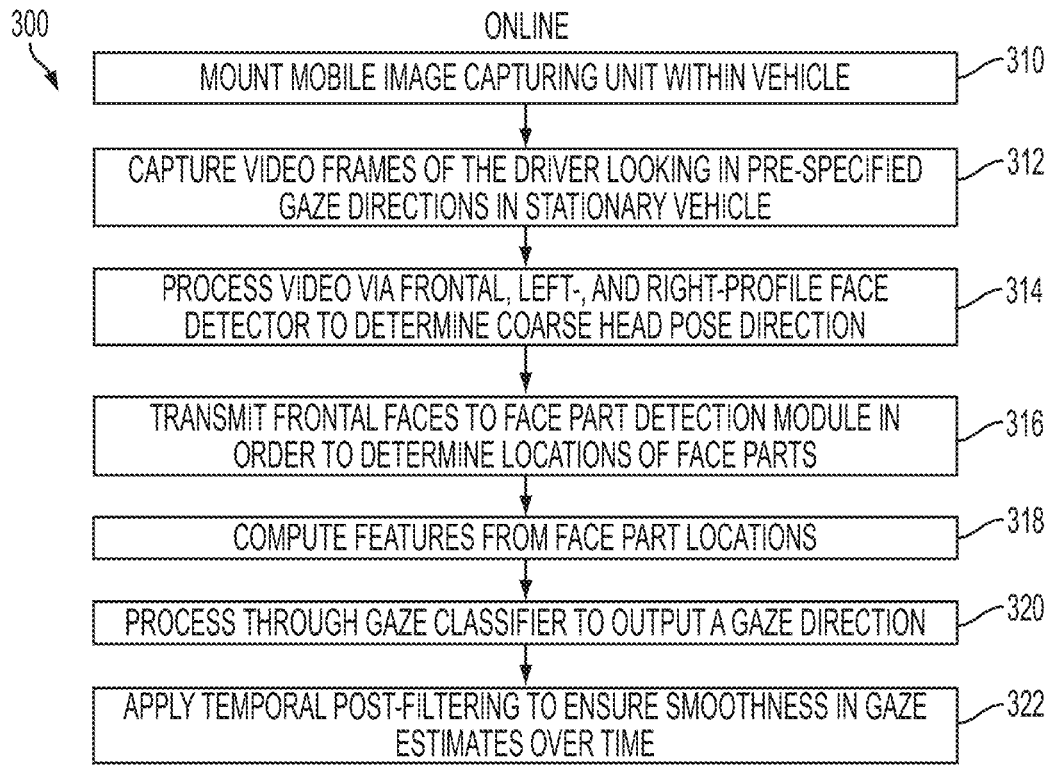
FIG. 3 illustrates a high-level flow chart of operations depicting logical operational steps of a gaze direction estimating method, which can be implemented in accordance with a preferred embodiment.
Figure 3:
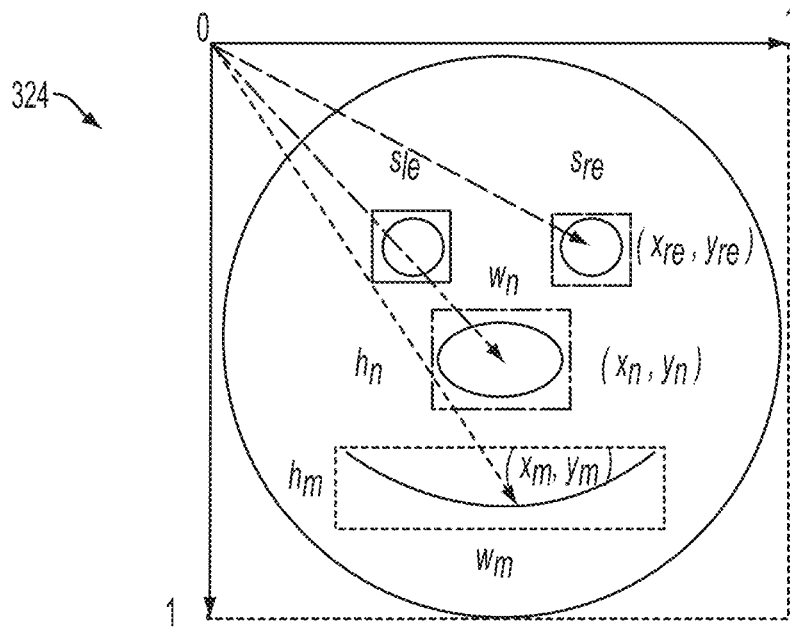

FIG. 3 illustrates a high-level flow chart of operations depicting logical operational steps of a gaze direction estimating method 300, which can be implemented in accordance with a preferred embodiment. Such a method 300 can be implemented in the context of, for example, a module such as, for example, module 152 shown in FIG. 2 and in the context of a gaze direction estimating system 300. Such a gaze direction estimating system can utilize an image-capturing unit associated with a mobile communications device that can be temporarily mounted on a vehicle for the purpose of driver monitoring. The use of such inexpensive and widely available mobile communications devices can offer a cost-effective service to its customers that do not rely upon dedicated built-in systems from automobile manufacturers.

The mobile image-capturing unit (e.g., camera) can capture an image of a vehicle driver within an effective field of view. The mobile communications device can be mounted on the windshield or dashboard of the vehicle, for example, automobiles, cars, trucks, vans, buses, motor homes, tankers, motorcycles, or other vehicles, etc., depending upon design consideration. The mobile image-capturing unit can be operatively connected to an image processing unit via, for example, a communications network. Such a mobile image-capturing unit may include built-in integrated functions such as image processing, data formatting, and data compression functions. Also, the unit can include imager-positioning, range-finding, and a flash bulb.

Note that the utilized network may employ any network topology, transmission medium, or network protocol. The network may include connections, such as wire, wireless communication links, or fiber optic cables. Network can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The mobile image-capturing unit integrated with the image processing unit can be employed to continuously monitor a vehicle driver within an effective field of view. The image processing unit receives a captured image from the mobile image-capturing unit in order to process the image/video. The image processing unit is preferably a small, handheld computer device or palmtop computer that provides portability and is adapted for easy mounting. The mobile image-capturing unit captures multiple images (e.g., vehicle drivers) when the vehicle is stationary or in motion, and the image processing unit processes each image.

Gaze estimation generally includes two major components: an online operational phase that receives input video of the driver driving a vehicle, processes the video through several computational steps including a gaze classifier to output a gaze direction; and an offline training phase that collects training data ahead of time and derives the parameters of the gaze classifier. Training data in the offline phase is collected into two steps: once within a stationary vehicle and once within a moving vehicle. The online and offline components are respectively described in detail with respect to FIGS. 3-4.

For the online operational phase, as indicated at block 310 in FIG. 3, an image-capturing unit can be mounted within or on a vehicle. Next, as shown at block 312, a step or operation can be implemeted to capture video frames of the driver looking in pre-specified gaze directions in a stationary vehicle. Thereafter, as depicted at block 314, a step or logical operation can be provided to process video via a frontal, left-, and right-profile face detector to determine a coarse head pose direction. For example, the face detectors can be derived utilizing a standard Adaboost cascade classifier with Haar-like feature descriptors, depending upon design consideration.

Then, as described at block 316, a step or logical operation can be provided to transmit frontal faces to the face part detection module in order to determine locations of face parts such as eyes, nose, and mouth. In one embodiment, for example, an Adaboost cascade classifier can be trained specifically to detect the respective face parts. Thereafter, as indicated at block 318, a step or logical operation can be implemented to compute features from face part locations. Next, as depicted at block 320, a step or logical operation can be provided to process through a gaze classifier to output data indicative of a particular gaze direction. In one possible embodiment, a multi-class linear support vector machine (SVM) classifier is invoked, with a one-versus-one scheme, wherein a binary decision function is learned between every pair of classes.

Finally, as illustrated at block 322, a step or logical operation can be implemented to apply temporal post-filtering to ensure smoothness in gaze estimates over time. That is, transitions between different gazes can be made to occur smoothly relative to the acquisition frame rate. For example, a sliding window of class labels from the previous five frames can be maintained and a majority voting scheme can be performed to determine a final prediction of driver gaze in the current frame. The sliding window approach requires a buffering operation to be performed and incurs in a slight delay (relative to real-time) in processing. In some embodiments, the capture rate may be, for example, 30 frames-per-second, so the delay caused by the temporal filtering operation is in the order of a fraction of a second.

The module that computes features from face part locations is now elaborated upon, as depicted in the schematic diagram 324 shown in FIG. 3. The schematic diagram 324 indicates relative face part features. A 14-dimension feature vector, for example, comprising normalized face part locations and sizes can be defined as follows:

$$x = (x_{le}, y_{le}, s_{le}, x_{re}, y_{re}, s_{re}, x_n, y_n, w_n, h_n, x_m, y_m, w_m, h_m) \quad (1)$$

where x and y are spatial locations, s denotes a side length of square bounding regions, and w and h denote width and height of bounding regions, respectively. Subscripts le, re, n, and m denote respectively left eye, right eye, nose, and mouth. The position and size of each face part are normalized by the lengths of the axes of the "face coordinate system". The latter is defined by the square surrounding the detected face, with the origin located at the top-left corner of the square. The normalization equations are:

$$(x_p, y_p) = \left( \frac{x_p^{cen} - x_f^{lt}}{s_f}, \frac{y_p^{cen} - y_f^{lt}}{s_f} \right), \quad (2)$$

$$s_p = s_p^{ori} / s_f, \quad (3)$$

$$(w_p, h_p) = w_p^{ori} / s_f, h_p^{ori} / s_f, \quad (4)$$

where subscript $p \in \{le, re, n, m\}$ denotes the face parts and variables with subscript f are facial coordinates and sizes. The value of each component of the feature vector is thus normalized to the range [0,1]. This makes the feature descriptors invariant to facial translation and scaling as well as to pixel resolution. Additionally, this intrinsic data normalization process ensures that decisions are not dominated by any particular feature. Lastly, the locations of the feature points can be temporally smoothed using, for example, a Kalman filter tracker.

Figure 4:
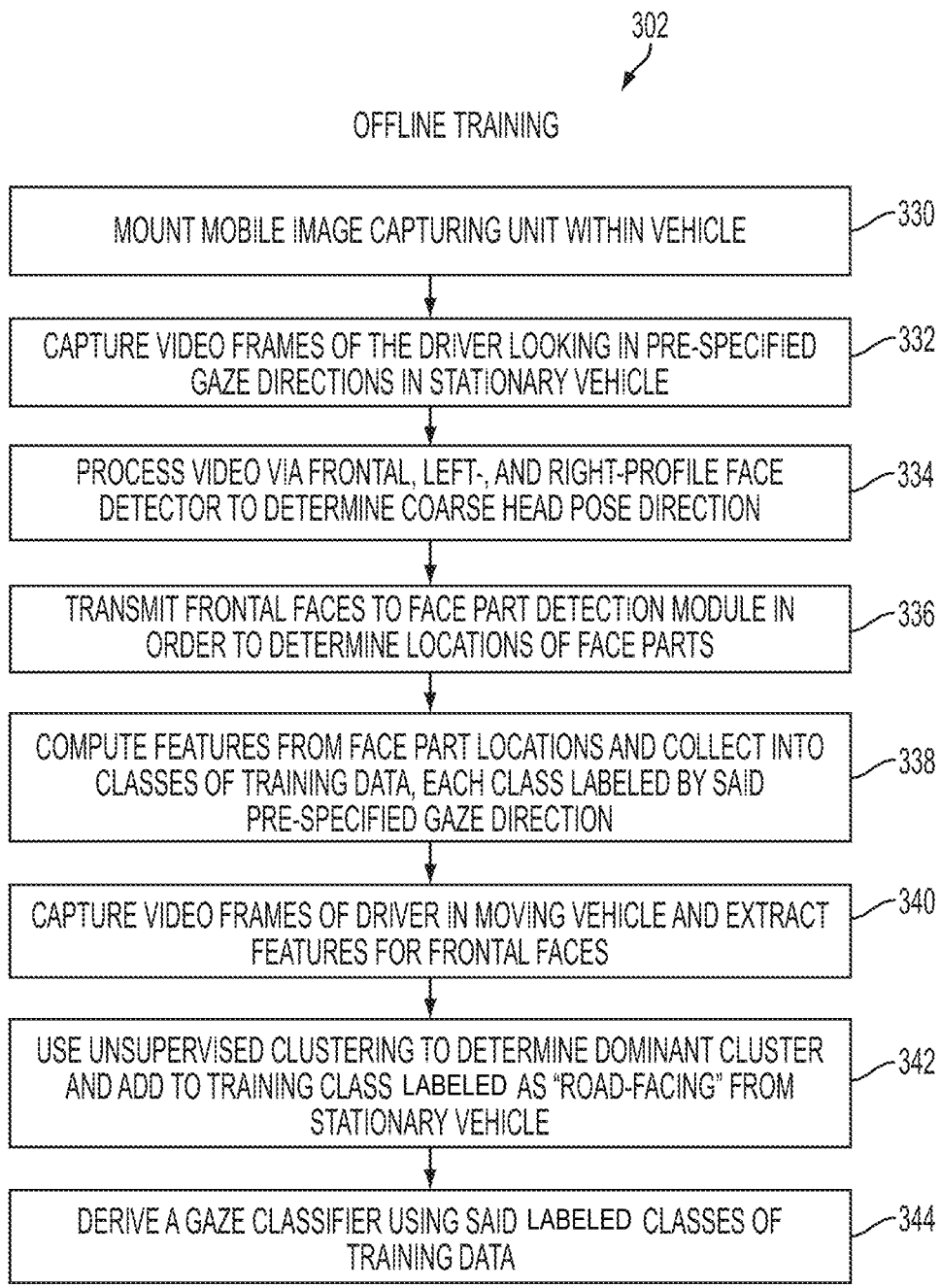
FIG. 4 illustrates a high-level flow chart of operations depicting logical operational steps of an offline method for training a gaze classifier for estimating and monitoring the gaze direction of a driver in a vehicle that is amenable for real-time execution on a portable mobile communications device, in accordance with the disclosed embodiments.

For the offline training phase of method 302 shown in FIG. 4, a step or logical operation can be implemented as shown at block 330 in which the mobile image capturing unit is mounted within a vehicle. It would be ideal to collect training video of the driver viewing all common gaze directions within a moving vehicle; however, this practice is neither safe nor convenient. To address this problem, training data is collected in two steps. First, as depicted at block 332, a step or logical operation can be provided to capture video frames of the driver looking in pre-specified gaze directions in a stationary vehicle. The driver is prompted to gaze in the pre-specified directions, and video recorded and training data collected for each gaze class. In this fashion, the training data is tailored for a particular driver, vehicle, camera, and camera configuration, thus producing more accurate gaze predictions. At the same time, data collection in a stationary vehicle is both safe and convenient.

Thereafter, as indicated at block 334, a step or logical operation can be implemented to process video via a frontal, left-, and right-profile face detector to determine a coarse head pose direction. Next, as illustrated at block 336, a step or logical operation can be provided to transmit frontal faces to the face part detection module in order to determine locations of face parts. Then, as described at block 338, a step or logical operation can be implemented to compute features from face part locations and collect into classes of training data, each class labeled by a pre-specified gaze direction.

Then, in the second step of training data collection, as indicated at block 340, a step or logical operation can be provided to capture vide frames of the driver in the moving vehicle and extract features for frontal face views. Next, as shown at block 342, a step or logical operation can be provided to use unsupervised clustering to determine a dominant cluster and add data to the training class labeled as, for example, "road-facing" from the stationary vehicle. Finally, as depicted at block 344, a step or logical operation can be implemented to derive a gaze classifier using the labeled classes of training data.

To elaborate on the second/moving stage of training data collection, the driver begins driving his or her normal route, and the application module 152 gathers video footage for a short period (e.g., 3-4 minutes). The face-part features from the frames are extracted. The various gaze directions form clusters in feature space and a critical assumption is made that the "road-gazing" class will be the dominant duster. The dominant cluster is identified via an unsupervised clustering technique described next.

Specifically, in a preferred embodiment, unsupervised clustering is accomplished with an Expectation-Maximization (E-M) algorithm applied to learn a Gaussian mixture model (GMM) from the available samples. From the GMM, one infers that the dominant cluster is that which has the greatest number of samples associated with it. Once the GMM and dominant duster are learned, the E-M algorithm assigns a K-dimensional probability vector to each input sample. Here, K represents the number of clusters, and the j-th element of the vector (where 1≤j≤K) is the probability that the input sample belongs to the j-th cluster. Next, the input samples whose highest probability entry corresponds to the dominant duster can be selected and marked as belonging to the road-gazing class. Once again, this approach assumes that during the initial driving period, the driver is most likely to gaze straight ahead at the road.

In addition, samples whose second highest probability entry corresponds to the dominant duster can also be added to the road-gazing class. A threshold on the ratio of largest membership to second largest membership, for example, can be set in some embodiments to control the number of data samples being added.

It is possible that in some (rare) instances, the dominant data collected in the moving vehicle during the calibration phase does not correspond to the road gazing class. If, for example, the driver is coming out of a parking lot or approaching a busy intersection, he/she may gaze in different directions. The application module 152 can utilize additional logic that compares data from the moving vehicle to the clusters gathered in the stationary vehicle to ensure that the dominant cluster indeed corresponds to road-gazing data. Additionally, input from other sensors (e.g., GPS or motion sensors) can be employed to assist in selecting only those video frames corresponding to driving on a straight road.

Finally, a classifier can be trained from the combination of data obtained in the moving stage for the road-gazing class in the moving vehicle and data obtained in the stationary stage for all the other gaze classes in the stationary vehicle. Specifically, an 'augmented' road-gazing class can be created by combining road-gazing samples from the stationary vehicle with data points belonging to the dominant cluster from the moving vehicle (assumed to belong to the road-gazing class). The remaining training classes can be left unmodified. In one possible embodiment, a multi-class linear support vector machine (SVM) classifier can be derived from the combined training data with a one-versus-one scheme, wherein a binary decision function is learned between every pair of classes. Alternatively, a one-versus-all scheme can be implemented in an alternative embodiment, wherein a binary decision function is learned between every class and the samples that don't belong to that class.

Figure 5:
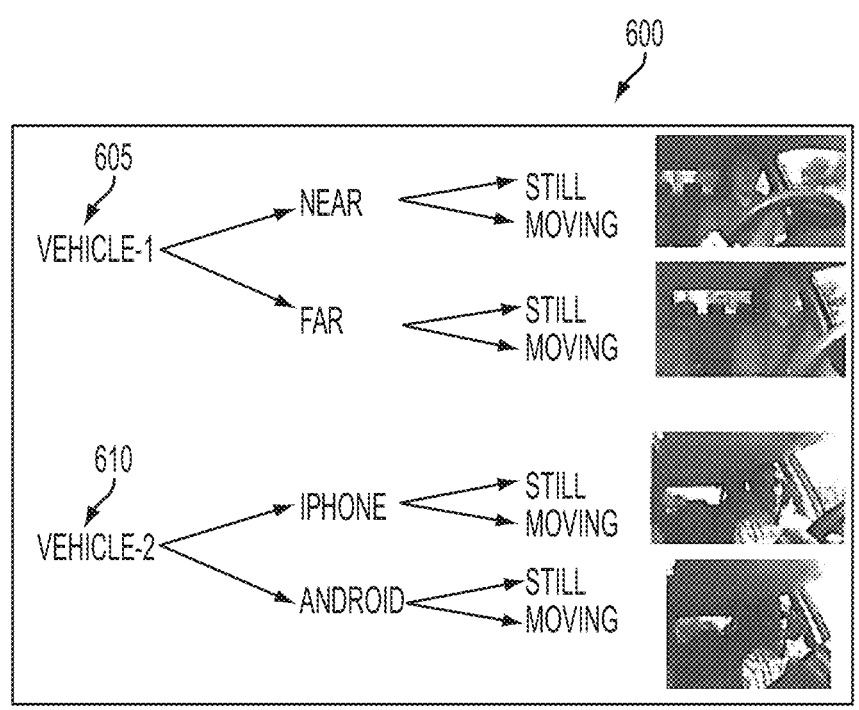
FIG. 5 illustrates a schematic view of video data sets from different scenarios, in accordance with the disclosed embodiments.

FIG. 5 illustrates a schematic view of exemplary video data sets 600 from different scenarios, in accordance with an embodiment. For example, video data can be captured by a driver-facing Smartphone image-capturing unit in four different experimental scenarios. The variations among scenarios lie in several aspects, including the types of vehicle/driver, the types of smartphones, and image-capturing unit mounting locations. Specifically, the videos can be collected separately in two types of vehicle. In the first vehicle 605, the Smartphone can be mounted at a near placement (closer to the driver) and a far placement (on the vehicle 202 central line, right below the rear-view mirror). In the second vehicle 610, video can be recorded by an iPhone and an Android phone. This figure shows exemplary configurations only. Other arrangements and types of smartphones and mobile cameras are conceivable.

Moreover, video capturing can be done in both the stationary and moving vehicle cases for each scenario, giving 8 different data sets in total. In the preferred embodiment, the driver gaze classifier employs the one-versus-one scheme, in which a binary decision function is learned between every pair of classes. Many standard methods from machine learning may be used to evaluate classifier performance. For example, during the training phase, the gathered data set is randomly split into a training set (80%) and a testing set (20%). A 10-fold cross validation is conducted within the training set to select the model parameter, and then the classifier can be trained accordingly and evaluated with the testing set.

Figures 6, 7:
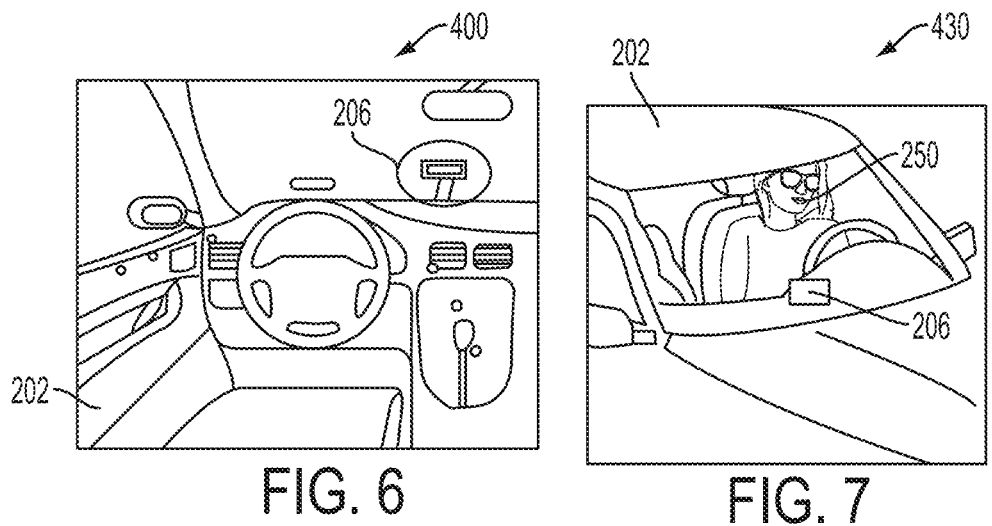
FIGS. 6, 7, and 8 illustrate pictorial views of an example image-capturing unit dashboard mount, driver view, and road view, in accordance with possible embodiments.
Figure 8:
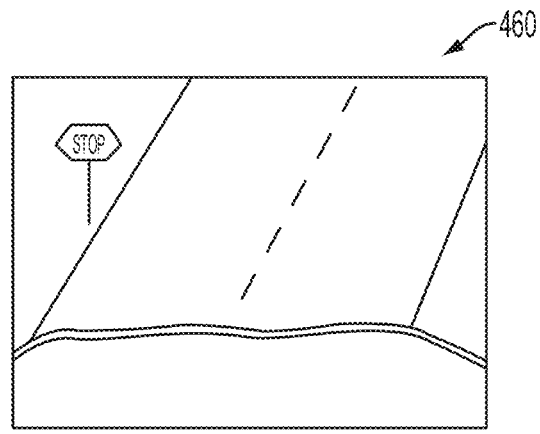

FIGS. 6, 7 and 8 illustrate pictorial views of an image-capturing unit dashboard mount 400, driver view 430, and road view 460 with respect to a vehicle 202 and a mobile device 206, in accordance with an embodiment. It can be appreciated that alternative embodiments may employ different components to accomplish the same overall goal. In the particular embodiments depicted in FIGS. 6-8, the mobile device 206 preferably includes a mobile image-capturing unit (e.g., a video camera). The mobile device can be mounted on, for example, the windshield or dashboard of the vehicle 202. Since laws in some states and jurisdictions in the United States place restrictions on windshield mounts, the dashboard mount is preferred, as shown in FIG. 6. However, this is not a limitation of the disclosed embodiments. The mobile image-capturing unit can be mounted near the center of the dashboard (i.e., below the rear view mirror), which is convenient for user interaction, and offers an acceptable view of the driver 250 as shown in FIG. 7. Note that the mobile image-capturing unit can be mounted near the center of the dashboard for monitoring road events, as shown in FIG. 8.

Figure 9:
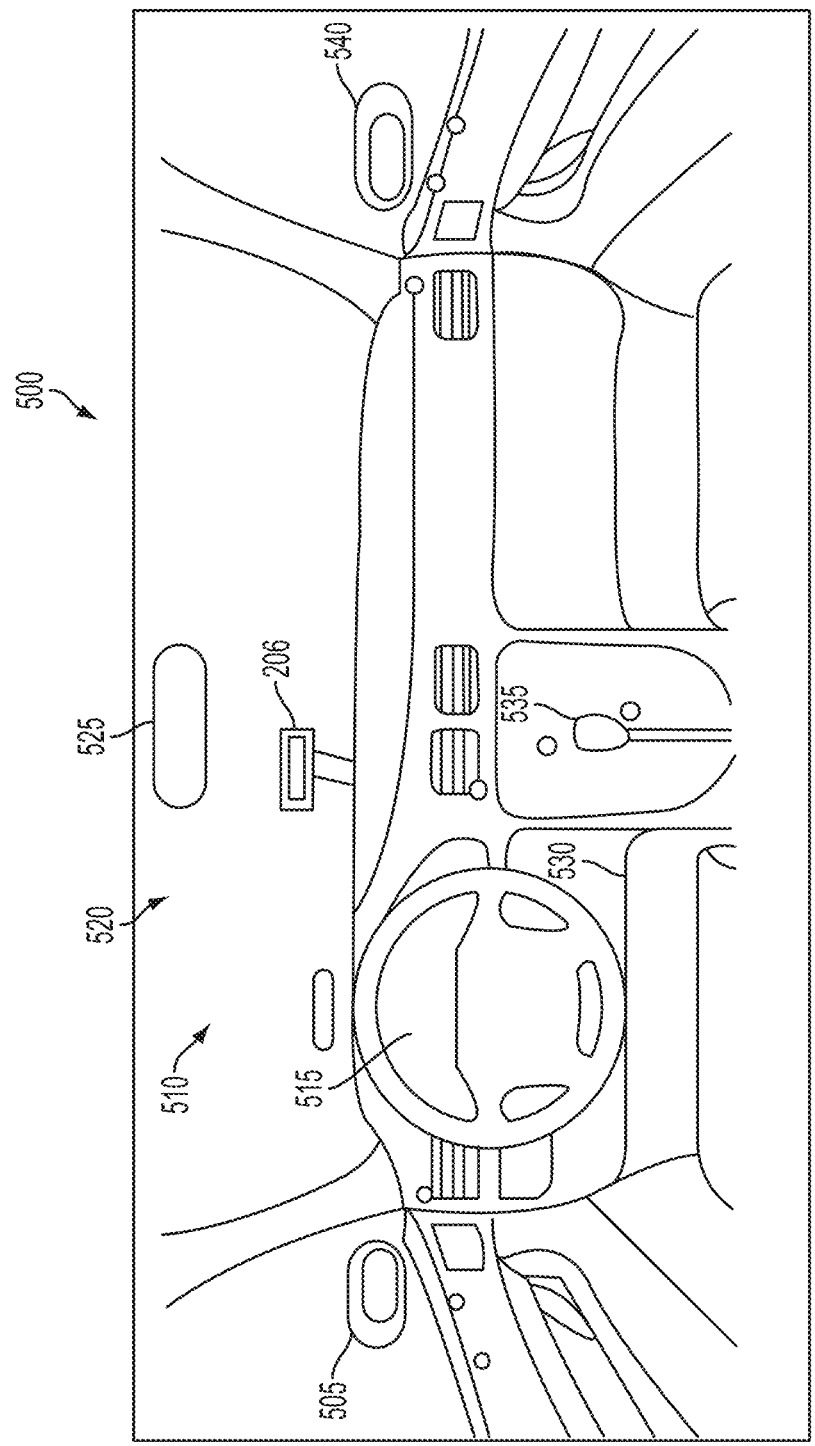
FIG. 9 illustrates a schematic view of eight common gaze directions utilized to train classifier, in accordance with the disclosed embodiments.

FIG. 9 illustrates a schematic view of eight common gaze directions 505, 510, 515, 520, 525, 530, 535, and 540 utilized to train the classifier, in accordance with the disclosed embodiments. The gaze space can be quantized into 8 gaze directions 505, 510, 515, 520, 525, 530, 535, and 540 commonly encountered during driving, as shown in FIG. 9. The gaze direction can be, for example, a left mirror 505, road 510, dashboard 515, sign 520, top mirror 525, phone/text 530, music console 535, and a right mirror 540. The gaze space can be represented by a small, but comprehensive set of directions specifically relevant to the act of driving.

FIG. 10 illustrates a table 750 depicting confusion matrix illustrating the classification performance of an algorithm in accordance with the disclosed embodiments. The confusion matrix is obtained for one experimental scenario (SUV, iPhone) to gain deeper insight into the performance of the in-situ classifier. The confusion lies between classes corresponding to similar gazes directions.

Figure 11:
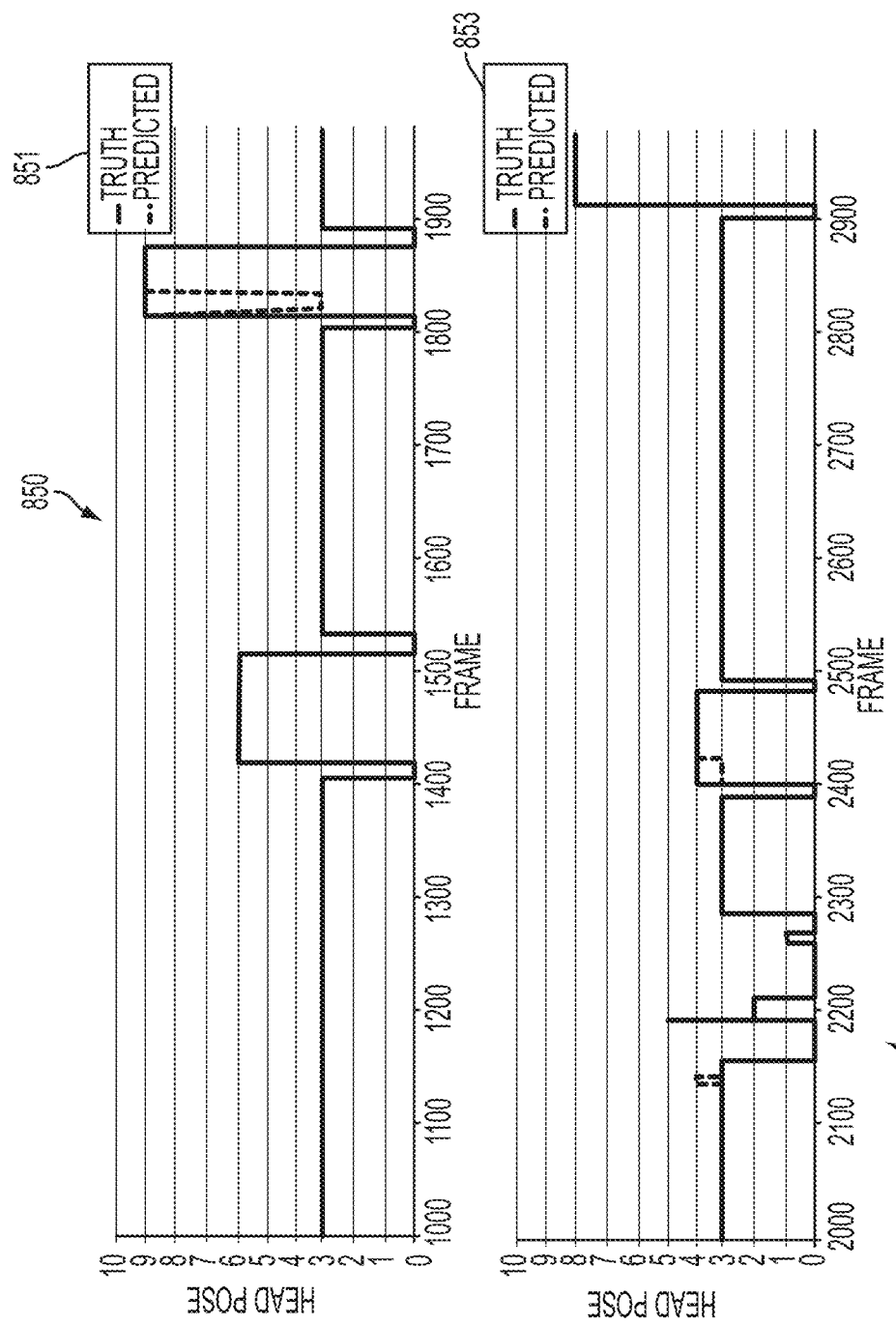
FIG. 11 illustrates a graph depicting time plots of predicted gaze direction by the system with a ground truth for one scenario, in accordance with an alternative embodiment.

FIG. 11 illustrates example graphs 850 and 852, which depict time plots of a predicted gaze direction by system in association with a ground truth for one possible scenario, in accordance with an embodiment. Graph 850 indicates a legend box 851 with respect to "Truth" and "Predicted" data. A similar legend box 853 is shown in graph 852. In general, graphs 850 and 852 indicate that the classifier output can be plotted as a function of time (or frame number) with the system. Note that the classifier outputs the correct label for a significant portion of time and that temporal post-smoothing of the classifier output labels can significantly improve classifier accuracy.

Figure 12:
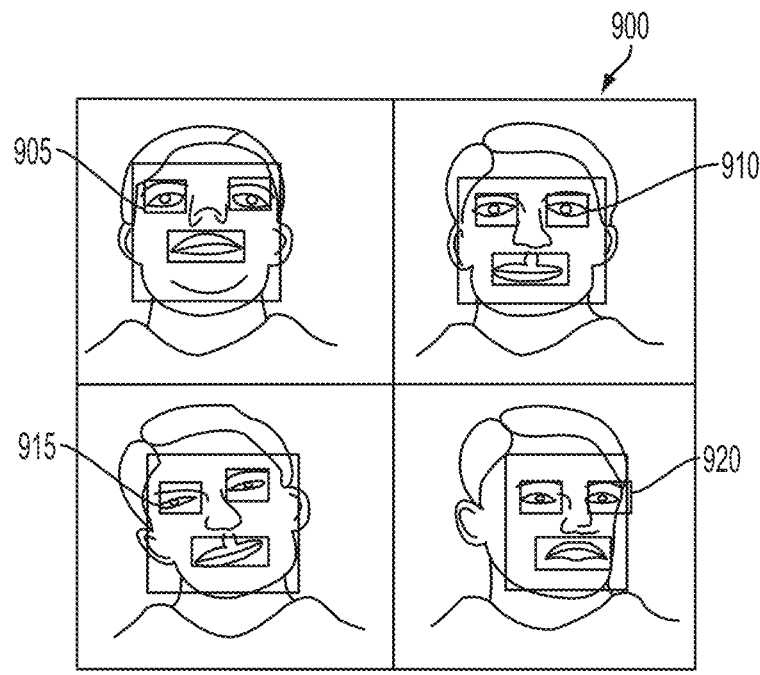
FIG. 12 illustrates example video frames for scenarios, in accordance with an alternative embodiment.
Figure 13:
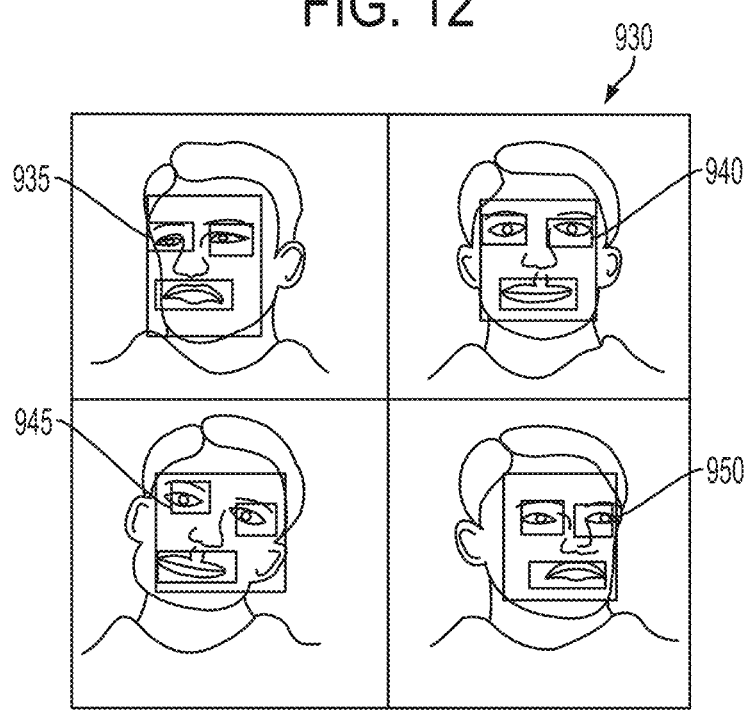
FIG. 13 illustrates sample video snapshots with final class labels in two different scenarios, in accordance with an alternative embodiment.

FIG. 12 illustrates a schematic view of a group of video frames 900 captured by a mobile device (e.g., device 206), in accordance with an embodiment. FIG. 13 illustrates a schematic view of a group of video frames 930 captured by a mobile device in accordance with an alternative embodiment. The video frame(s) 900 shown in FIG. 12, for example, indicate a variety of gaze directions 905, 910, 915, 920. For example, the gaze direction 905 may indicate that the individual shown in the video frame is looking at the rear view mirror while in a vehicle. The gaze direction 910 may indicate that the individual is looking at the road in front of the vehicle.

The gaze direction 915 may indicate, for example, that the individual is merely adjusting his head (e.g., a crook in his neck). The gaze direction 920, on the other hand, may indicate that the individual is looking at the left mirror. On the other hand, the gaze directions 935, 940, 945, and 950 shown in the video frames 930 in FIG. 13 may indicate different (or similar) actions. For example, the gaze direction 935 depicted in FIG. 13 may indicate that the driver is gazing at a right mirror, while the gaze direction 940 may indicate that the driver is looking at the road ahead. The gaze direction 945 again may only indicate some other unimportant action such as the driver adjusting his neck. The gaze direction 950, on the other hand may indicate that the driver is glancing out of his left window.

The disclosed system can be implemented in association with any type of mounted camera and imaging system and covers the notion of fusing video input with data obtained from other sensors such as, for example, an accelerometer, a gyroscope, and/or other telematics from the vehicle (e.g., braking and steering wheel movement).

The gaze estimating module 152 can conceivably be an integral part of a larger driver monitoring system that incorporates road-facing video capture along with input from other sensors (e.g., GPS, accelerometer, vehicle telematics, etc.) to place the estimate gaze direction in context with the state of the vehicle (e.g., speed, acceleration, turning, etc.) and its environment (e.g., is the vehicle on a highway or near a busy intersection) and to determine if the driver 250 is paying attention to relevant objects or incidents on the road. Various follow-on actions can be conceived in the system 200, depending on the desired application. Examples include providing a real-time visual, audio, or tactile notification to the driver 250 that he/she is not attentive to the road. In the driver exam/instruction application, the system may compile and present a report with good/bad driving behavior, and guidance for improved driving.

Such an approach can be employed for enhanced driver safety, instructional/evaluation aid for student drivers, and evidentiary support for traffic incidents. The classifier can be dynamically trained in-situ to achieve a high level of robustness across variations in vehicles, drivers, and image-capturing unit capture parameters. The system can be readily detected via the presence of the monitoring image-capturing unit and a user feedback that can be relayed based on accurate gaze monitoring.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for continuously monitoring the gaze direction of a driver of a vehicle over time, said method comprising:

receiving video captured by a mobile image-capturing unit comprising camera within a vehicle, said camera of said mobile image-capturing unit mounted facing a driver of said vehicle;
extracting frames from said video;
detecting a facial region corresponding to a face of said driver within said extracted frames;
computing feature descriptors from said facial region, said feature descriptors comprising at least one feature vector comprising a multi-dimension feature vector:
normalizing each component of said at least one feature vector Including face part locations and sizes associated with said facial region to render said feature descriptors invariant to facial translations and scaling as well as pixel resolution, wherein said normalizing comprises normalizing a position and size of said face by lengths of axes of a face coordinate system defined by a square surrounding said detected face with an origin located at a top-left corner of said square: and
applying a gaze classifier with respect to said vehicle, said driver, and said camera, wherein said gaze classifier receives said feature descriptors as inputs and outputs at least one label corresponding to at least one of a predefined finite number of common driving gaze directions to identify a gaze direction of said driver of said vehicle.

2. The method of claim 1 further comprising applying temporal filtering to said at least one label to obtain a smooth estimate of said gaze direction over time, such that transitions between different gazes are configured to occur smoothly relative to an acquisition frame rate of said frames extracted from said video.

3. The method of claim 2 further comprising training said gaze classifier by capturing in an offline operation, video segments of said driver corresponding to all gaze classes in said vehicle, while said vehicle is stationary.

4. The method of claim 3 further comprising training said gaze classifier by:
capturing in an offline operation video segments of said driver in said vehicle, while said vehicle is moving;
performing unsupervised clustering to extract training data corresponding to a road-facing class in said moving vehicle;
combining data from said stationary vehicle for all gaze classes with data from said moving vehicle for the road-facing class to form a training set; and
deriving said gaze classifier from said training set.

5. The method of claim 2 wherein detecting said facial region comprises running three detectors respectively for a frontal, left-, and right-facial profile, and wherein subsequent steps of computing feature descriptors and applying said gaze classifier are executed only for instances where a frontal face is detected.

6. The method of claim 5 further comprising deriving said three detectors for said frontal, left- and right-facial profile using Haar-like features and Adaboost cascade classifiers, wherein said unsupervised clustering is accomplished with an Expectation-Maximization (E-M) algorithm applied to learn a Gaussian mixture model (GMM) from available samples of said gaze direction.

7. The method of claim 6 further comprising follow-on actions depending on a desired application, said follow-on actions comprising providing to said driver real-time visual information, audio information, and a tactile notification that said driver is not being attentive.

8. A system for continuously monitoring the gaze direction of a driver of a vehicle over time, said system comprising:
- a processor; and
- a non-transitory computer-usable medium embodying computer program code, said non-transitory computer-usable medium capable of communicating with said processor, said computer program code comprising instructions executable by said processor and configured for:
  - receiving video captured by a mobile image-capturing unit comprising a camera within a vehicle, said camera of said mobile image-capturing unit mounted facing a driver of said vehicle;
  - extracting frames from said video;
  - detecting a facial region corresponding to a face of said driver within said extracted frames;
  - computing feature descriptors from said facial region, said feature descriptors comprising at least one feature vector comprising a multi-dimension feature vector:
  - normalizing each component of said at least one feature vector including face part locations and sizes associated with said facial region to render said feature descriptors invariant to facial translations and scaling as well as pixel resolution, wherein said normalizing comprises normalizing a position and size of said face by lengths of axes of a face coordinate system defined by a square surrounding said detected face with an origin located at a top-left corner of said square; and
  - applying a gaze classifier with respect to said vehicle, said driver, and said camera, wherein said gaze classifier receives said feature descriptors as inputs and outputs at least one label corresponding to at least one of a predefined finite number of gaze classes to identify a gaze direction of said driver of said vehicle.

9. The system of claim 8 wherein said instructions are further configured for applying temporal filtering to said at least one label to obtain a smooth estimate of said gaze direction over time, such that transitions between different gazes are configured to occur smoothly relative to the acquisition frame rate of said frames extracted from said video.

10. The system of claim 9 wherein said instructions are further configured for training said gaze classifier by capturing in an offline operation, video segments of said driver corresponding to all gaze classes in said vehicle, said vehicle comprising a stationary vehicle.

11. The system of claim 10 wherein said instructions are further configured for training said gaze classifier by:
- capturing in an offline operation video segments of said driver in said vehicle, said vehicle comprising a moving vehicle;
- performing unsupervised clustering to extract training data corresponding to a road-facing class in said moving vehicle;
- combining data from said stationary vehicle for all gaze classes with data from said moving vehicle for the road-facing class to form a training set; and
- deriving said gaze classifier from said training set.

12. The system of claim 10 wherein said instructions are further configured for detecting said facial region comprises running three detectors respectively for a frontal, left-, and right-facial profile, and wherein subsequent steps of computing feature descriptors and applying said gaze classifier are executed only for those instances where a frontal face is detected.

13. The system of claim 12 wherein said instructions are further configured for deriving said three detectors for said frontal, left-, and right-facial profile using Haar-like features and Adaboost cascade classifiers, wherein said unsupervised clustering is accomplished with an Expectation-Maximization (E-M) algorithm applied to learn a Gaussian mixture model (GMM) from available samples of said gaze direction.

14. The system of claim 13 wherein said instructions are further configured for conceiving follow-on actions depending on a desired application, said follow-on actions comprising providing to said driver: real-time visual information, audio information, and a tactile notification that said driver is not being attentive.

15. A non-transitory processor-readable medium storing computer code representing instructions to cause a process for continuously monitoring the gaze direction of a driver of a vehicle over time, said computer code further comprising code to:
- receive video captured by a mobile image-capturing unit comprising a camera within a vehicle, said camera of said mobile image-capturing unit mounted facing a driver of said vehicle;
- extract frames from said video;
- detect a facial region corresponding to a face of said driver within said extracted frames;
- compute feature descriptors from said facial region, said feature descriptors comprising at least one feature vector comprising a multi-dimension feature vector:
- normalize each component of said at least one feature vector including face part locations and sizes associated with said facial region to render said feature descriptors invariant to facial translations and scaling as well as pixel resolution, wherein said normalizing comprises normalizing a position and size of said face by lengths of axes of a face coordinate system defined by a square surrounding said defected face with an origin located at a top-left corner of said square: and
- apply a gaze classifier with respect to said vehicle, said driver, and said camera, wherein said gaze classifier receives said feature descriptors as inputs and outputs at least one label corresponding to at least one of a predefined finite number of gaze classes to identify a gaze direction of said driver of said vehicle.

16. The processor-readable medium of claim 15 wherein said code further comprises code to apply temporal filtering to said at least one label to obtain a smooth estimate of said gaze direction over time, such that transitions between different gazes are configured to occur smoothly relative to the acquisition frame rate of said frames extracted from said video.

17. The processor-readable medium of claim 16 wherein said code further comprises code to train said gaze classifier by capturing in an offline operation, video segments of said driver corresponding to all gaze classes in said vehicle, said vehicle comprising a stationary vehicle.

18. The processor-readable medium of claim 17 wherein said code further includes code to train said gaze classifier by:
- capturing in an offline operation video segments of said driver in said vehicle, said vehicle comprising a moving vehicle;
- performing unsupervised clustering to extract training data corresponding to a road-facing class in said moving vehicle;

combining data from said stationary vehicle for all gaze classes with data from said moving vehicle for the road-facing class to form a training set; and deriving said gaze classifier from said training set.

19. The processor-readable medium of claim 18 wherein said code further includes code to detect said facial region comprises running three detectors respectively for a frontal, left-, and right-facial profile, and wherein subsequent steps of computing feature descriptors and applying said gaze classifier are executed only for those instances where a frontal face is detected.

20. The processor-readable medium of claim 16 wherein said code further includes code to conceive follow-on actions depending on a desired application, said follow-on actions comprising providing to said driver: real-time visual information, audio information, and a tactile notification that said driver is not being attentive.

* * * * *